July 4, 1950  H. L. LURAY  2,513,576
TRANSPARENCY VIEWER
Filed Jan. 9, 1947

INVENTOR.
HOWARD LURAY
BY Edwin Leisohn
ATTORNEY

Patented July 4, 1950

2,513,576

UNITED STATES PATENT OFFICE 2,513,576

TRANSPARENCY VIEWER

Howard L. Luray, Brooklyn, N. Y.

Application January 9, 1947, Serial No. 720,974

8 Claims. (Cl. 40—130)

This invention relates to display devices for transparencies.

Transparencies in the form of color positives finished on color film have become very popular with amateur as well as professional photographers, and are more and more taking the place of the more costly color prints. However, the known devices for displaying and viewing these transparencies are not very well suited for general use in homes and commercial establishments, because they are quite expensive, do not present the most favorable settings for the pictures and fail to reveal the transparencies to their best advantage. Moreover, the known devices of this type are not readily adaptable for the display of transparencies of widely differing sizes and also lack facilities for interchanging transparencies with ease and dispatch.

It is the primary aim and object of the present invention to provide a comparatively simple, compact and inexpensive device or viewer of this type which has none of the defects of the known devices and which is equally well suited for home use and for commercial use.

It is a more particular object of the present invention to provide a viewer of this type which affords an advantageous setting for a transparency, and to equip the viewer with cool and even illumination so as to reveal even the finest qualities of the transparency, such as its true color rendition and its three-dimensional effect.

It is another particular object of the present invention to provide a viewer of this type which will satisfactorily reveal the finer qualities of a transparency with or without artificial illumination of the same.

The above and other objects, features and advantages of the present invention will be fully understood from the following description, reference being had to the accompanying illustrative drawings.

Figure 1:
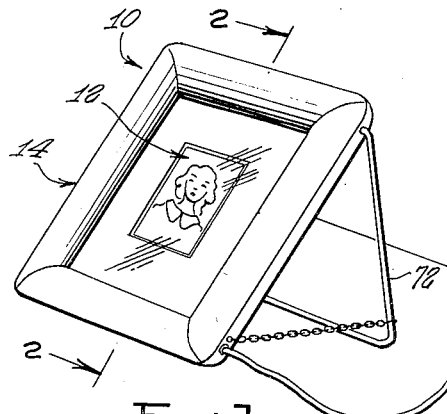
Fig. 1 is a perspective view of a transparency viewer embodying the present invention.

Referring to the drawings the reference numeral 10 designates a viewer for a transparency 12 which may be in form of a color film finished as a natural color positive. The viewer 10 comprises a frame 14 which may be rectangular as shown, or which may assume any other shape. The frame 14 preferably consists of front and rear sections 16 and 18, respectively, which are hingedly connected at 20 (Figs. 2 and 3) for relative opening and closing movement. Conventional latching means 22 may be provided on the sections 16, 18 releasably to hold them in their closed relation. The front section 16 of the frame 14 is rabbeted as at 24 (Fig. 2) for the reception of a sandwich 26, which comprises a transparent front cover 28, mats 30 with the interposed transparency 12, and a preferably translucent rear cover 32. The front cover 28 may be clear glass or transparent plastic. The mats 30, which have cut-out windows 34 for the display of the finished positive on the transparency 12, may be made of any suitable material, such as wood, cardboard, or the like. The rear cover 32 is preferably of ground glass so as to diffuse all light emanating from within or from the rear of the frame 14. Preferably interposed between the sandwich 26 and the rabbet 24 in the front section 16 of the frame 14 is a liner 40 or felt, or the like, which not only acts as a soft cushion for the front cover 28, but also prevents the leakage of light from the interior of the frame to the front thereof.

Figure 3:
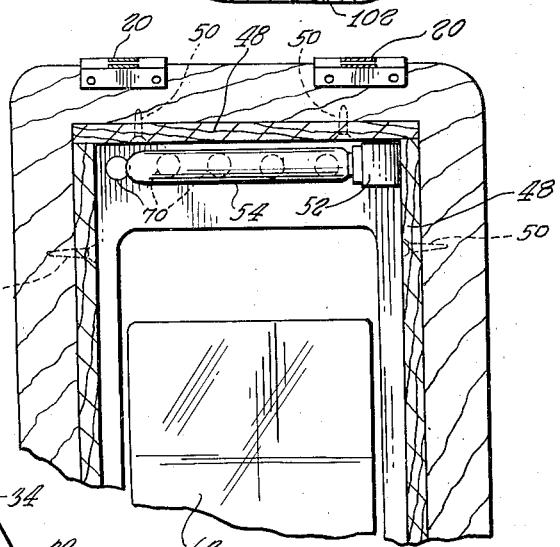
Fig. 3 is a fragmentary section through the viewer, taken on the line 3—3 of Fig. 2.
Figure 2:
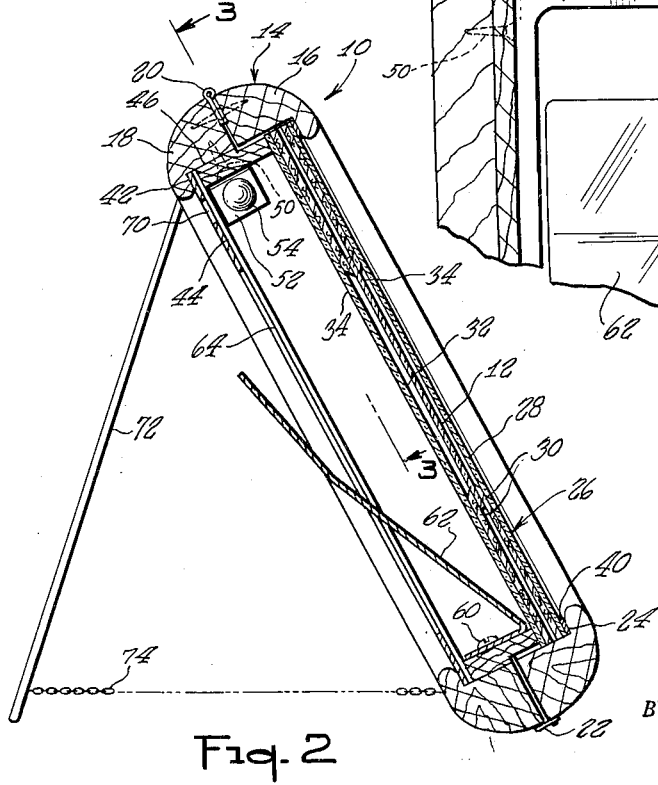
Fig. 2 is an enlarged section through the viewer, taken on the line 2—2 of Fig. 1.

The rear section 18 of the frame 14 is also rabbeted as at 42 for the reception of a rear plate 44 and a clamping frame 46. The clamping frame 46 may be rectangular as shown in Figs. 2 and 3, and is so dimensioned as to project, in the closed condition of the frame 14, into the frame section 16 and clamp the sandwich 26 therein against the liner 40, thus conveniently and securely holding the sandwich 26 in place in the closed frame 14. The sides of the clamping frame 46 may conveniently be made of separate pieces 48 of any suitable material such as wood, for instance, which are preferably secured to the frame section 18 by screws 50. Suitably mounted on one of the sides of the clamping frame 46 is a conventional socket 52 for an electric light bulb 54, the latter being connectible with a conventional source of electric current by means of an electrical cord 56 (Fig. 1). The light bulb 54 may be either of the incandescent or the fluorescent type.

Suitably mounted at 60 on the clamping frame 46 is a reflector 62 which, in the present instance, extends rearwardly through an aperture 64 in the plate 44 to the outside of the frame 14 (Fig. 2). The reflector 62 is throughout its area in light-reflecting relation with the electric bulb 54, and reflects light from the latter onto the translucent rear cover 32 of the sandwich 26, and more particularly onto the lower portion of the rear cover 32. On the other hand, the light bulb 54, being placed as remote as possible from the displayed transparency 12 to keep the heat from the bulb away from the transparency, directly illuminates the upper portion of the rear cover 32, more so than the lower portion thereof. Hence, the remotely placed light bulb 54 cooperates with the reflector 62 in substantially evenly illuminating the rear cover 32, and particularly that portion thereof which is adjacent the displayed transparency 12.

To provide for ventilation of the closed frame 14, the rear plate 44 is provided adjacent and alongside the bulb 54 with a series of vents 70 through which the heated air around the bulb 54 may escape, while fresh air enters the frame 14 through the aperture 64 in the rear plate 44, and in doing so, keeps the portion of the rear cover 32 adjacent the displayed transparency 12 cool. Either section of the frame 14 may also carry a hinged easel 72, and the latter is preferably connected by a flexible link 74 with the frame 14 in order to prevent collapse of the latter when in the standing position shown in Figs. 1 and 2.

The instant viewer may be made of simple, rugged construction and the frame 14 thereof may be fashioned to simulate any form of picture frame that affords a most advantageous setting for the type of transparency displayed, be it a portrait, landscape or any other depiction. Also, the frame sections 16 and 18 may be made of any suitable material, such as wood, metal or plastic. The display of the transparency in the windows 34 in the mats 30 enhances the setting for the picture proper. The provision in the viewer of the mats 30 with their relatively wide margins, which frame the displayed transparency in addition to the frame 14, readily adapt the viewer for the advantageous display of transparencies of differing sizes through the use of interchangeable mats 30 which have different size windows. Also, the provision of the clamping frame 46 in the rear section 18 of the frame greatly facilitates the quick interchange of transparencies in the viewer. Moreover, the contained construction of the viewer lends to the same the overall appearance of a conventional picture frame of pleasing appearance.

The relatively large aperture 64 in the rear plate 44 in the frame 14 permits, despite the presence of the reflector 62, the passage of sufficient daylight or any other suitable light into the frame 14 from the rear thereof, so as to reveal at the front of the viewer the displayed transparency for ready discernment, even if the light bulb 64 is out. Hence, the instant viewer secures the important advantage that the same may be used for its intended purpose even when the light 54 is off, and may be illuminated internally for special display purposes only.

The instant viewer may, instead of, or in addition to, the easel 72, be provided with a suitable hanger (not shown) for suspending the viewer from a nail or the like on a wall or similar support. Also, the rear plate 44 may be provided along one of its side edges with additional vents (not shown) to permit the expeditious escape of heat from inside the viewer when the same is stood on one of its side edges.

Figure 4:
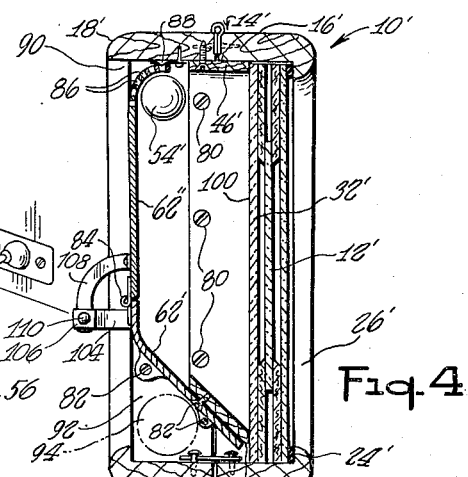
Fig. 4 is a section through another viewer embodying the present invention in a modified manner.

Fig. 4 shows a modified viewer 10', the frame 14' of which consists of hinged front and rear sections 16' and 18', respectively, both of which are rabbeted as at 24' and 42', respectively. The rabbet 24' in the front section 16' of the frame receives the sandwich 26', including the displayed transparency 12', which is conveniently and securely held in place by a clamping frame 46', suitably secured to the rear section 18' of the frame by screws 80 or the like. An electric light bulb 54' is mounted in a suitable socket in the rear section 18' of the frame, and is preferably removed as far as possible from that portion of the rear cover 32' of the sandwich that lies adjacent the displayed transparency 12'. A reflector 62' is arranged in the frame 14' in the inclined fashion shown, and is suitably secured to the rear section 18' of the frame and also to the clamping frame 46' by screws 82, or the like. Hinged at 84 on the reflector 62' is a reflector continuation 62'', the upper end of which is preferably curved and extends part-way around the bulb 54', and is also provided with a plurality of vents 86. Also provided in the rear section 18' of the frame may be a spring catch 28 which is adapted to cooperate with one of the vents 86 in order to hold the reflector extension 62'' in the closed position shown. The rear section 18' of the frame is also recessed as at 90 to permit swinging movement of the reflector extension 62'' to and from closed position. It appears from Fig. 4 that the preferably translucent rear cover 32' of the sandwich 26' receives direct light from the bulb 54', as well as light reflected from the reflector 62', 62'', resulting in substantially even illumination of the displayed transparency 12' throughout its area. Also, the curved, vented end of the reflector extension 62'' not only reflects additional light from the bulb 54' onto the rear cover 32' of the sandwich 26', but acts also as an efficient light trap preventing light from the interior of the viewer to pass freely to the rear thereof and thereby distract from the illuminated effect of the displayed transparency.

The space in the rear section 18' of the frame between the bottom thereof and the reflector 62' forms a compartment 92 in which may be placed one or more flash light batteries 94, to serve as a power source for the light bulb 54', in which case suitable wiring (not shown) is provided to connect the batteries 94 with the light bulb 54'. If the compartment 92 is not being used for the storage of a battery or batteries 94, the same permits the convenient placement into the frame 14' of a clamp for securing the viewer 10' to any suitable support such as a display counter, for instance. The bottom side of the clamping frame 46' may also be inwardly offset from the clamping faces 100 of the remaining sides of said frame, so as to leave between the rear cover 32' of the clamped sandwich 26' and the clamping frame 46' a gap 102 for the ingress of atmospheric air into the interior of the frame 14'.

Figure 5:
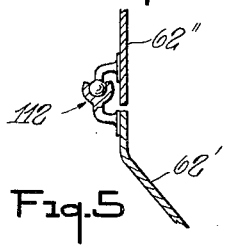
Fig. 5 is a fragmentary sectional illustration of a modification of the viewer shown in Fig. 4.

In order to hold the reflector extension 62'' in any adjusted open position for the reflection of light from any source outside the viewer 10' upon the translucent rear cover 32' of the sandwich 26', when the light 54' is turned off, the reflector 62' may be provided with a rearwardly extending lug 104, having a forked end 106 in which an arcuate arm 108 on the reflector extension 62'' is received and held in any adjusted position of the latter by a clamping screw 110. Also, instead of hingedly mounting the reflector extension 62'' on the reflector 62', the same may be mounted on the latter by means of a universal joint 112 (Fig. 5), so as to be swingable into any position to reflect light from any outside source upon the translucent rear cover of the sandwich in the viewer.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. A transparency viewer comprising, a frame having closable front and rear sections of which said front section has a window opening and is rabbeted for the reception of the margins of a transparency displayed in said opening, means carried by said rear section for clamping the displayed transparency in said rabbet on closing said sections, said means being outside the confines of said opening when said sections are closed, lighting means in said rear section, said rear section having another opening for admitting outside light to the rear of the displayed transparency, and said lighting means being outside the confines of said other opening, and a reflector in said rear section also located outside the confines of said other opening and being in light-reflecting relation with said lighting means to illuminate the displayed transparency.

2. A transparency viewer comprising, a frame having closable front and rear sections of which said front section has a window opening and is rabbeted, for the reception of the margins of a transparency displayed in said opening, means carried by said rear section for clamping the displayed transparency in said rabbet on closing said sections, said means being outside the confines of said opening when said sections are closed, and said rear section having another opening for admitting outside light to the rear of the displayed transparency lighting means in said rear section outside the confines of said other opening, and a reflector in said rear section also located outside the confines of said other opening and being in light-reflecting relation with said lighting means, said reflector and lighting means being further coordinated so as to illuminate the displayed transparency with direct and reflected light substantially evenly throughout.

3. A transparency viewer comprising, a frame having closable front and rear sections of which said rear section is open in the back and said front section has a window opening for the display of a transparency in said front section, a translucent backing for the displayed transparency in said front section, lighting means in said rear section, a first reflector in said rear section in light-reflecting relation with said lighting means to illuminate said backing in the closed relation of said sections, and another reflector hingedly connected with said first reflector and swingable into positions to reflect outside light through the open back of said rear section upon said backing.

4. A transparency viewer comprising, a frame having closable front and rear sections of which said rear section is open in the back and said front section has a window opening for the display of a transparency in said front section, a translucent backing for the displayed transparency in said front section, lighting means in said rear section, a first reflector in said rear section partly closing the back thereof and being in light-reflecting relation with said lighting means to illuminate said backing in the closed relation of said sections, and another reflector hingedly connected with said first reflector and adjustable into positions to close the remainder of the back of said rear section and to reflect outside light upon said backing, respectively.

5. A transparency viewer comprising, a frame having closable front and rear sections of which said rear section is open in the back and said front section has a window opening for the display of a transparency in said front section, a translucent backing for the displayed transparency in said front section, lighting means in said rear section, a first reflector in said rear section partly closing the back thereof and being in light-reflecting relation with said lighting means to illuminate said backing in the closed relation of said section, another reflector hingedly connected with said first reflector and adjustable into positions to close the remainder of the back of said rear section and to reflect outside light upon said backing, respectively, and means on said reflectors for locking said other reflector to said first reflector in any adjusted position of the former.

6. A transparency viewer comprising a frame having closable front and rear sections of which said rear section is open in the back and said front section has a window opening for the display of a transparency in said front section, a translucent backing for the displayed transparency in said front section, lighting means in said rear section, a first reflector in said rear section in light-reflecting relation with said lighting means to illuminate said backing in the closed relation of said sections, another reflector, and a universal joint connecting said other reflector with said first reflector so that the former is swingable in any position to reflect any outside light through the open back of said rear section upon said backing.

7. A transparency viewer comprising, a frame having closable front and rear sections of which said rear section is open in the back and said front section has a window opening for the display of a transparency in said front section, a translucent backing for the displayed transparency in said front section, lighting means in said rear section, a first reflector in said rear section partly closing the back thereof and being in light-reflecting relation with said lighting means to illuminate said backing in the closed relation of said sections, another reflector, and a universal joint connecting said other reflector with said first reflector so that the former is adjustable into positions to close the remainder of the back of said rear section and to reflect any outside light upon said backing, respectively.

8. A transparency viewer comprising, a frame having closable front and rear sections of which said rear section is open in the back and said front section has a window opening for the display of a transparency in said front section, a translucent backing for the displayed transparency in said front section, lighting means in said rear section, a first reflector in said rear section partly closing the back thereof and being in light-reflecting relation with said lighting means to illuminate said backing in the closed relation of said sections, and another reflector hingedly connected with said first reflector and adjustable into positions to close the remainder of the back of said rear section and to reflect outside light upon said backing, respectively, at least one of said reflectors having a vent.

HOWARD L. LURAY.

REFERENCES CITED

The following references are of record in the file of this patent:

UNITED STATES PATENTS

| Number | Name | Date |
|---|---|---|
| 1,383,978 | Brewster | July 5, 1921 |
| 1,393,008 | Carboni | Oct. 11, 1921 |
| 1,422,480 | Rutherford | July 11, 1922 |
| 1,452,430 | Mercer | Apr. 17, 1923 |
| 1,620,533 | Fullgraff | Mar. 8, 1927 |
| 1,621,351 | Clement | Mar. 15, 1927 |
| 2,147,560 | Schupbach | Feb. 14, 1939 |
| 2,153,149 | MacHarg | Apr. 4, 1939 |